3,480,145
MAGNETIC FILTER
Donald W. Gladden, P.O. Box 1037,
Mesilla Park, N. Mex. 88047
Filed Feb. 23, 1968, Ser. No. 707,699
Int. Cl. B01d 35/06, 29/00
U.S. Cl. 210—223                                    2 Claims

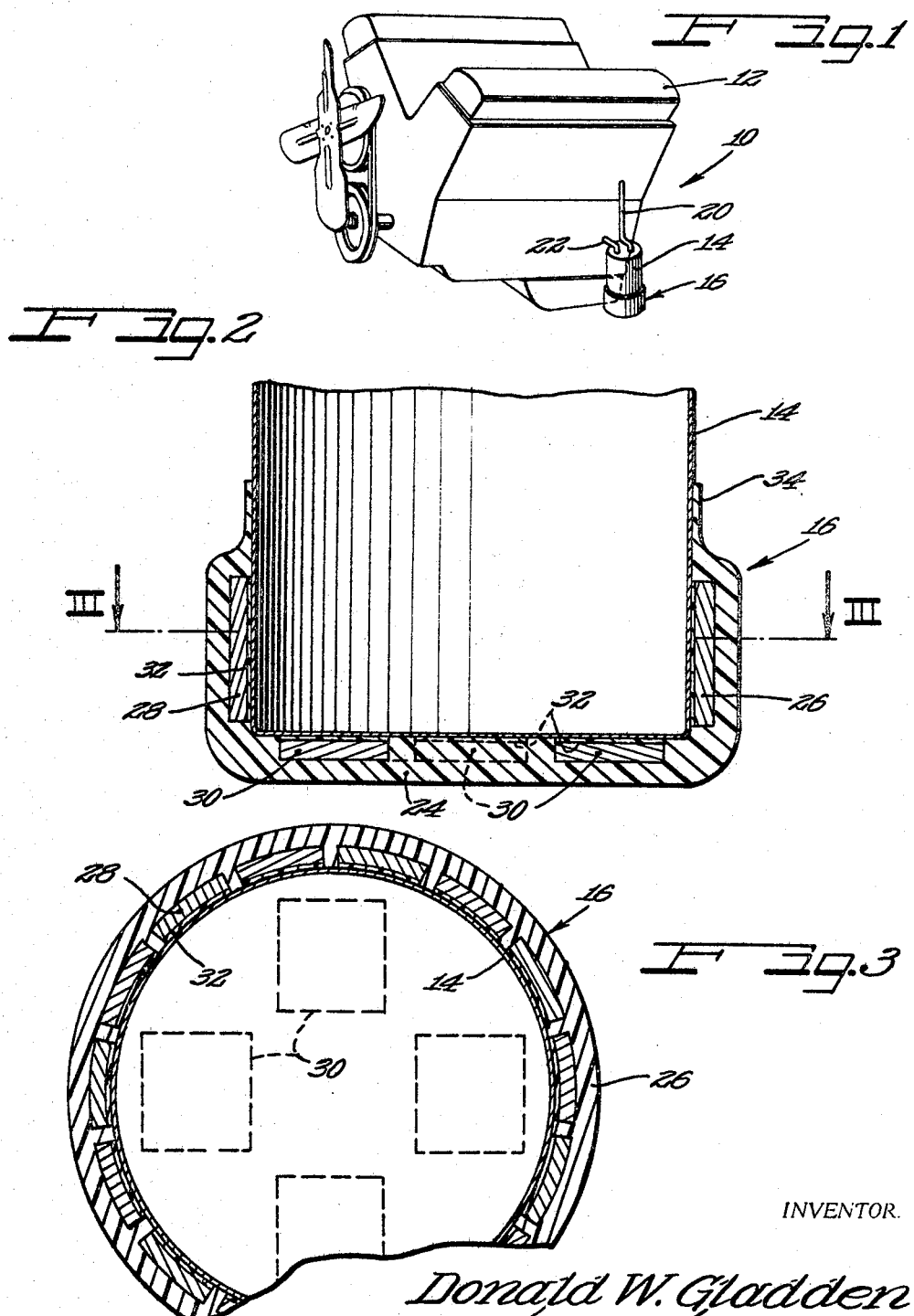

ABSTRACT OF THE DISCLOSURE

A filtering device comprising a cup member having a plurality of magnets disposed in the walls and base of the cup. The cup is molded of a material such as plastic or latex and sized to fit over the end of an oil filter can of an internal combustion engine. The magnets attract magnetic particles suspended in the liquid passing through the filter. The invention also includes the method of filtering magnetic particles from the oil system of internal combustion engines.

Background of the invention

This invention pertains to an improved magnetic filter device especially suited for use with internal combustion engine fuel and oil systems, and more particularly to an improved magnetic filter for small sized magnetic particles in suspension.

Prior art

It is known to use filters in connection with the fuel and oil supply systems of internal combustion engines. In such systems prior to entering a carburetor apparatus and being charged into an engine combustion chamber, fuel is filtered to remove foreign matter, water, grit such as sand, magnetic particles and the like. Such filters are generally equipped with mechanical filter elements such as a ceramic filter which is usually constructed as finely as possible without overly retarding the flow of fuel through the filter.

Some of the metallic particles to be filtered from the fuel are magnetizable such as iron and steel. A portion of these magnetizable particles are usually sufficiently fine to pass through the mechanical filter element. The other type of filter element generally included in filters is composed of magnets which are so located as to effect only a small portion of the fuel, and are difficult to remove from the filter. When the magnet is installed in an obscure location in the filter device, or is difficult to remove, it is likely that it will be retained in service until it is so loaded with magnetizable material as to become relatively ineffective.

Summary

Accordingly, a principal object of the present invention is to provide a magnetic filter for filtering various kinds of fluids such as gasoline, fuel oil, coolants, and the like, to remove minute particles of free iron and steel from the fluid.

Another object of the invention is to provide a magnetic fluid filter having a means for removing magnetic particles from the fluid when disposed in sliding fit relationship to a filter can.

A further object of the present invention is to provide a simplified magnetic fluid filter which can be readily installed and replaced.

Still another object of the present invention is to provide a magnetic filter wherein the magnetic means and the filter assembly is held in operative position by magnetic and frictional means.

Many other advantages, features and additional objects of the present invention will become manifest to those versed in the art upon making reference to the detailed description and the accompanying sheet of drawings in which a preferred structure embodiment incorporating the principles of the present invention is shown by way of illustrative example.

On the drawings:

FIG. 1 is a perspective view of an internal combustion engine illustrating an operative environment of the magnetic filter;

FIG. 2 is a partial sectional view of the magnetic filter installed on a filter can; and FIG. 3 is a sectional view of the walls of the magnetic filter taken along the line III—III of FIG. 2.

As shown on the drawings:

The principles of this invention are particularly useful when embodied in a magnetic filter for an internal combustion engine as illustrated in FIG. 1, generally indicated by the numeral 10. The internal combustion engine 10 includes a block 12 having a filter can 14 such as for the oil system attached thereto. At the free end of the oil filter can 14 is a magnetic filter 16 frictionally and magnetically secured to the can 14. A pair of conduits 22 and 24 lead from the engine block 12 to the filter 14 to provide inlet and outlet of oil from the engine block.

The oil filter 14 is of the standard cylindrical or can type. The magnetic filter 16 is adapted to be slipped over the free end of the can 14 until a base 24 of the filter 16 contacts the end of the can 14. Contacting the sides of the filter can 14 is a cylindrical side wall 26.

Embedded in the magnetic filter 16 are a plurality of magnets 28 in the cylindrical wall 26 and a plurality of magnets 30 in the base 24. The magnets 28 and 30 are embedded and separated from the filter can 14 by the material 32 of the magnetic filter.

At the free end of the magnetic cup 16 is a sealing member or lip portion 34 adapted to sealingly engage the wall of the can 14.

The magnetic filter is manufactured under the trademark "Magna Cup" and has the following dimensions: an inside diameter of 3⅝"; an outside diameter of 4¼"; cylindrical walls of 2"; and a lip portion of ½".

The magnetic filter 16 is adapted to frictionally, magnetically and slidably engage the filter can 14 and magnetically attract all magnetic particles circulating in oil from the internal combustion engine 10 that cannot be filtered by mechanical means such as those which may pass through a ceramic filter. The magnetic filter 16 is easy to slip over the filter can assembly 14 and may be readily replaced. The magnetic filter 16 has no moving parts and is long lasting as well as being interchangeable between one internal combustion engine and another.

The removal of magnetic particles from oil or other fluid increases the life of the internal combustion engine. The material of the magnetic filter 16 may be of latex or of a plastic. For example, a synthetic organic plastic having resistance to deformation and to attack by oils and greases and having resilient properties can be used, such as nylon, which is a linear polymeric amide; "Celcon," which is a copolymer of trioxane; "Delrin," which is an acetyl resin or a polymerized formaldehyde resin; "Marlex," which is a polyethylene; and polyurethanes. In general, a polymer resin or other synthetic plastics should be selected that has a high degree of flexibility and considerable elasticity, together with high tensile strength and resistance to flow under moderate loading pressures, inertness to oils and greases or other lubricants and capable of being molded. Also the material should be nonmagnetic to enable the magnets 28 and 30 to attract particles within the filter can 14.

It has been found that the magnetic filter 16 as manufactured under the trademark "Magna Cup" will slip over all of the original equipment fuel flow screw on oil filters presently used on the internal combustion engine of automobiles. It is also contemplated to use the magnetic filter of the invention in other environments where magnetic particles are intended to be extracted from a fluid.

It will be noted that the magnetic filter 16 thus shown and described is particularly adapted for use in automobile oil filter can assemblies. The magnetic filter 16 is adapted to save space as the filter can 14 is the sole support for the magnetic filter 16. The filter 16 is relatively inexpensive to manufacture, and may be discarded and replaced by a new filter after a predetermined period of use.

The permanent magnets 28 and 30 which may be of any type such as "Alnico" are embedded in the magnetic filter 16 and merely slip off the oil filter 14 with the filter 16. The filter 16 may be removed from a discarded filter 14 and inserted on a replacement filter or used on a different automobile internal combustion engine.

The lip 34 of the magnetic filter 16 provides a seal against the walls of the oil filter 14. The lip 34 thereby provides a leak proof joint between the oil filter 14 and the magnetic filter 16.

The invention includes the method of magnetically filtering a fluid comprising forming a cup shaped body embedding a plurality of magnets disposed in the base and the cylindrical walls of the cup, attaching the cup to a fluid filter can of corresponding diameter such that the magnets attract magnetic particles within a filter can.

Although minor modifications might be suggested by those versed in the art, it should be understood that I wish to embody within the scope of the patent warrant hereon all such embodiments as reasonable and properly come within the scope of my contribution to the art.

I claim as my invention:
1. A magnetic filtering adapter for a filter can for filtering fluid comprising
   a cup of polymeric non-magnetic material adapted to frictionally engage the exterior of an end and side walls of a filter can,
   and a plurality of permanent magnets embedded in the ends and side walls of said cup to attract magnetic material contained in fluid flowing through the filter can and thus prevent the discharge of such magnetic material with the filtered fluid.
2. A magnetic filtering adapter as set forth in claim 1 wherein the walls of the cup terminate in a thin integral portion which sealingly engages the walls of the can to prevent ingress of a foreign material between the cup and the can.

References Cited

UNITED STATES PATENTS

| 2,838,179 | 6/1958 | Thomas | 210—223 |
| 3,121,683 | 2/1964 | Fowler | 210—223 |

REUBEN FRIEDMAN, Primary Examiner

T. A. GRANGER, Assistant Examiner